United States Patent [19]

Yoshii

[11] Patent Number: 5,042,872
[45] Date of Patent: Aug. 27, 1991

[54] PILLAR STRUCTURE FOR FRONT BODY PORTION OF AUTOMOBILE

[75] Inventor: Noboru Yoshii, Aki, Japan

[73] Assignee: Mazda Motor Corporation, Hiroshima, Japan

[21] Appl. No.: 386,588

[22] Filed: Jul. 31, 1989

[30] Foreign Application Priority Data

Jul. 30, 1988 [JP] Japan .................... 63-191729

[51] Int. Cl.⁵ ............................................ B62D 25/08
[52] U.S. Cl. ..................................... 296/203; 296/194; 296/209
[58] Field of Search ............... 296/29, 30, 187, 191, 296/193, 194, 201, 202, 203, 204, 205, 209

[56] References Cited

U.S. PATENT DOCUMENTS

| 4,516,803 | 5/1985 | Kaltz et al. | 296/107 |
| 4,529,243 | 7/1985 | Kaltz et al. | 296/107 |
| 4,537,440 | 8/1985 | Brockway et al. | 296/108 |
| 4,615,558 | 10/1986 | Nakamura et al. | 296/203 |
| 4,669,776 | 6/1987 | Harasaki | 296/194 |
| 4,747,636 | 5/1988 | Harasaki et al. | 296/203 X |
| 4,804,222 | 2/1989 | Sakiyama et al. | 296/204 x |

FOREIGN PATENT DOCUMENTS

| 2411865 | 9/1974 | Fed. Rep. of Germany . | |
| 53-14813 | 5/1978 | Japan . | |
| 58-20461 | 4/1983 | Japan . | |
| 57070 | 4/1984 | Japan | 296/194 |
| 59-118681 | 8/1984 | Japan . | |
| 61-154163 | 3/1985 | Japan . | |
| 61-155267 | 3/1985 | Japan . | |
| 61-155268 | 3/1985 | Japan . | |
| 61-155269 | 3/1985 | Japan . | |
| 61-215178 | 3/1985 | Japan . | |
| 92170 | 5/1985 | Japan | 296/194 |
| 131376 | 7/1985 | Japan . | |
| 169376 | 7/1986 | Japan | 296/209 |
| 61-165880 | 10/1986 | Japan . | |
| 61-183781 | 11/1986 | Japan . | |
| 62-91775 | 6/1987 | Japan . | |
| 18784 | 1/1989 | Japan | 296/209 |

Primary Examiner—Margaret A. Focarino
Assistant Examiner—Andrew C. Pike
Attorney, Agent, or Firm—Wenderoth, Lind & Ponack

[57] ABSTRACT

An automobile front body structure is provided on each side with a pillar extending substantially vertically, a side sill extending longitudinally of the vehicle body and secured to a lower end of the pillar and a separation member extending substantially vertically inside the pillar to form at least two separated portions having closed cross-sections inside the pillar. The separation member further extends into the inside of the side sill to separate it into two separated portions having closed cross-sections.

8 Claims, 6 Drawing Sheets

PILLAR STRUCTURE FOR FRONT BODY PORTION OF AUTOMOBILE

BACKGROUND OF THE INVENTION

1. Field of the Invention

The present invention generally relates to an automobile body structure, and more particularly, to an automobile front body structure.

2. Description of the Prior Art

In some conventional automobiles, a reinforcement wall is provided between a pillar and side sill in order to partition the space therebetween and to rigidify the connection therebetween.

Such an arrangement is disclosed in Japanese Utility Model Laid-Open Application No. 61-183781.

In automobiles, and in particular, in open type automobiles, it is necessary to provide a rigid connection between the front pillar and the side sill thereof in order to rigidify the entire front portion of the vehicle body. It is particularly important to rigidify the front pillar along the longitudinal direction of the vehicle body.

However, the prior art, as exemplified by the aforementioned Japanese document, has concentrated on raising the rigidity of the connection between the front pillar and the side sill rather than raising the rigidity of the front pillar itself. Accordingly, there remains room for improvement in regard to raising the rigidity of the vehicle body.

SUMMARY OF THE INVENTION

Accordingly, an essential object of the present invention is to provide an improved automobile front body structure in which the rigidity of a front pillar, as well as a connecting portion between the front pillar and a side sill, is increased, so as to thereby increase the rigidity of the entire vehicle body.

Another important object of the present invention is to provide an automobile front body structure of the above described type which is simple in construction and can be readily manufactured at a low cost.

In accomplishing these and other objects, an automobile front body structure according to one preferred embodiment of the present invention is provided on its one side with a pillar extending substantially vertically, a side sill extending in a direction longitudinally of a vehicle body and secured to a low end of the pillar and a separation member extending substantially vertically inside the pillar to form at least two separated portions having closed cross sections inside the pillar. The separation member also extends into and separates the inside of the side sill.

This construction results in the formation of the separated portions within the pillar which adjoin along the longitudinal direction of the vehicle body and increase the rigidity of the pillar in the longitudinal direction, as compared with the rigidity of a pillar having only a single portion of closed cross section formed therein (i.e. a pillar having no separation member).

The separation member for separating the inside of the pillar into two separated portions also extends into the side sill and separates it into two separated portions having closed cross sections and being adjoined along the longitudinal direction of the vehicle body. Accordingly, the two closed portions are enlarged by being formed not only inside the pillar but inside the side sill, thereby raising the rigidity of the pillar, particularly in the longitudinal direction of the vehicle body.

The part of the separation member which extends into the side sill acts as a reinforcing member which extends and connects the pillar to the side sill so as to increase the rigidity of the connection between the pillar and the side sill.

In this way, the rigidity of both the pillar and the connection between the pillar and the side sill are increased, thereby effectively increasing the rigidity of the entire vehicle body. This construction is preferably employed in the front body structure of an open type automobile body which requires relatively high rigidity at its front portion.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
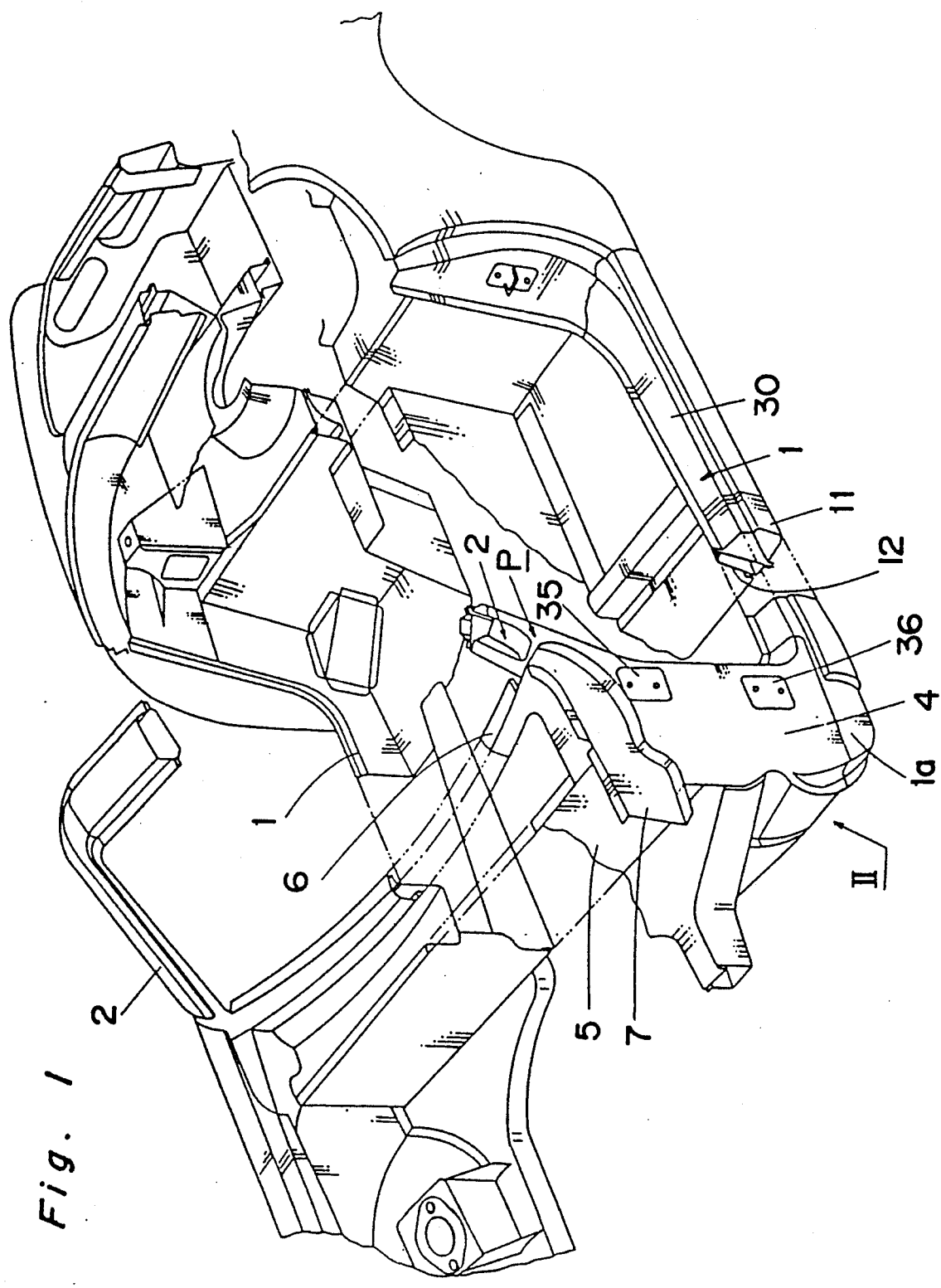
FIG. 1 is a perspective view of a main portion of a vehicle body to which a front body structure according to the present invention is applied.

Referring now to the drawings, a main portion of the vehicle body of an open type car is shown in FIG. 1 and is provided with a front body structure according to one preferred embodiment of the present invention.

Figure 2A:
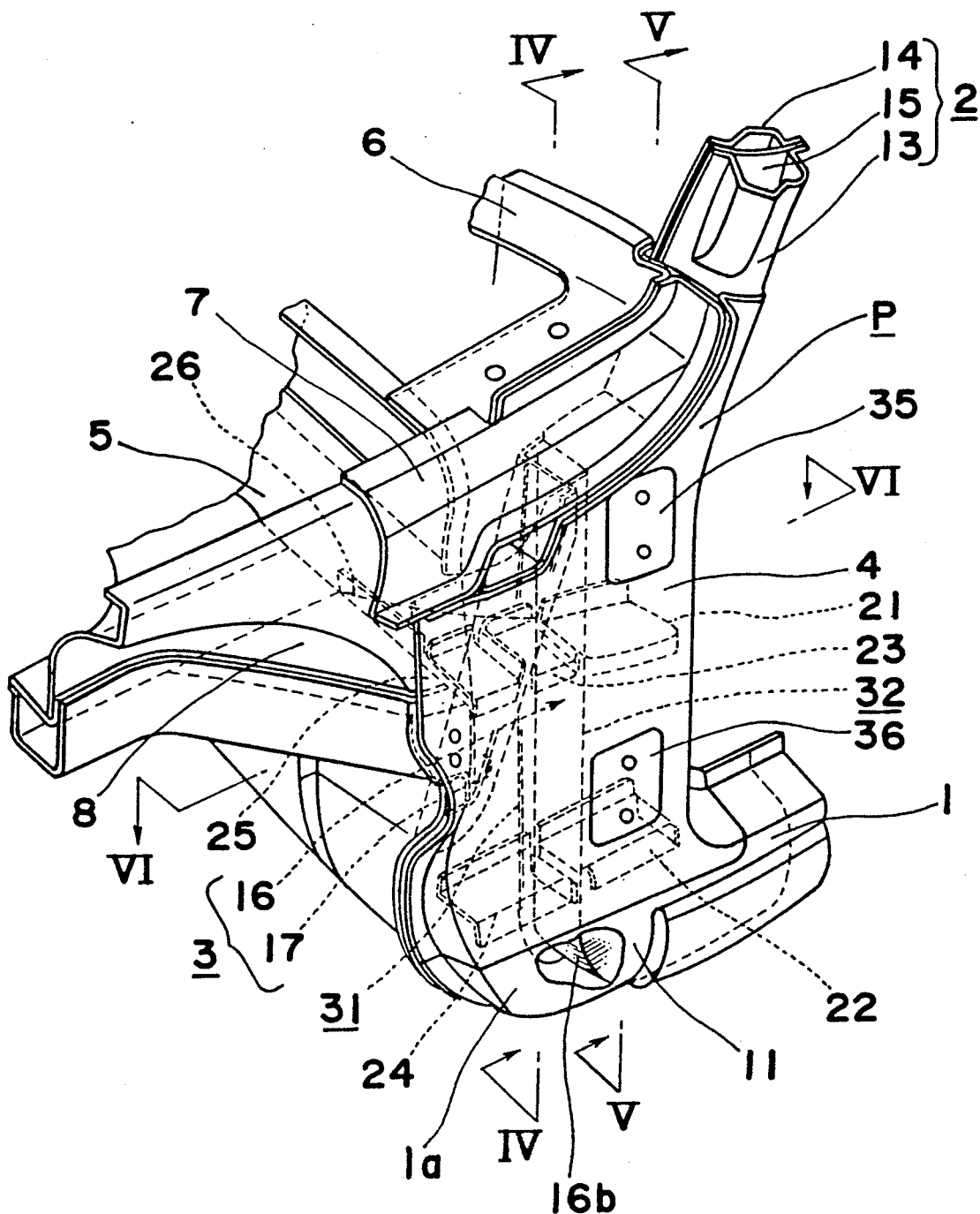
FIG. 2A is an enlarged detail view of a portion shown by a reference numeral II in FIG. 1.
Figure 2B:
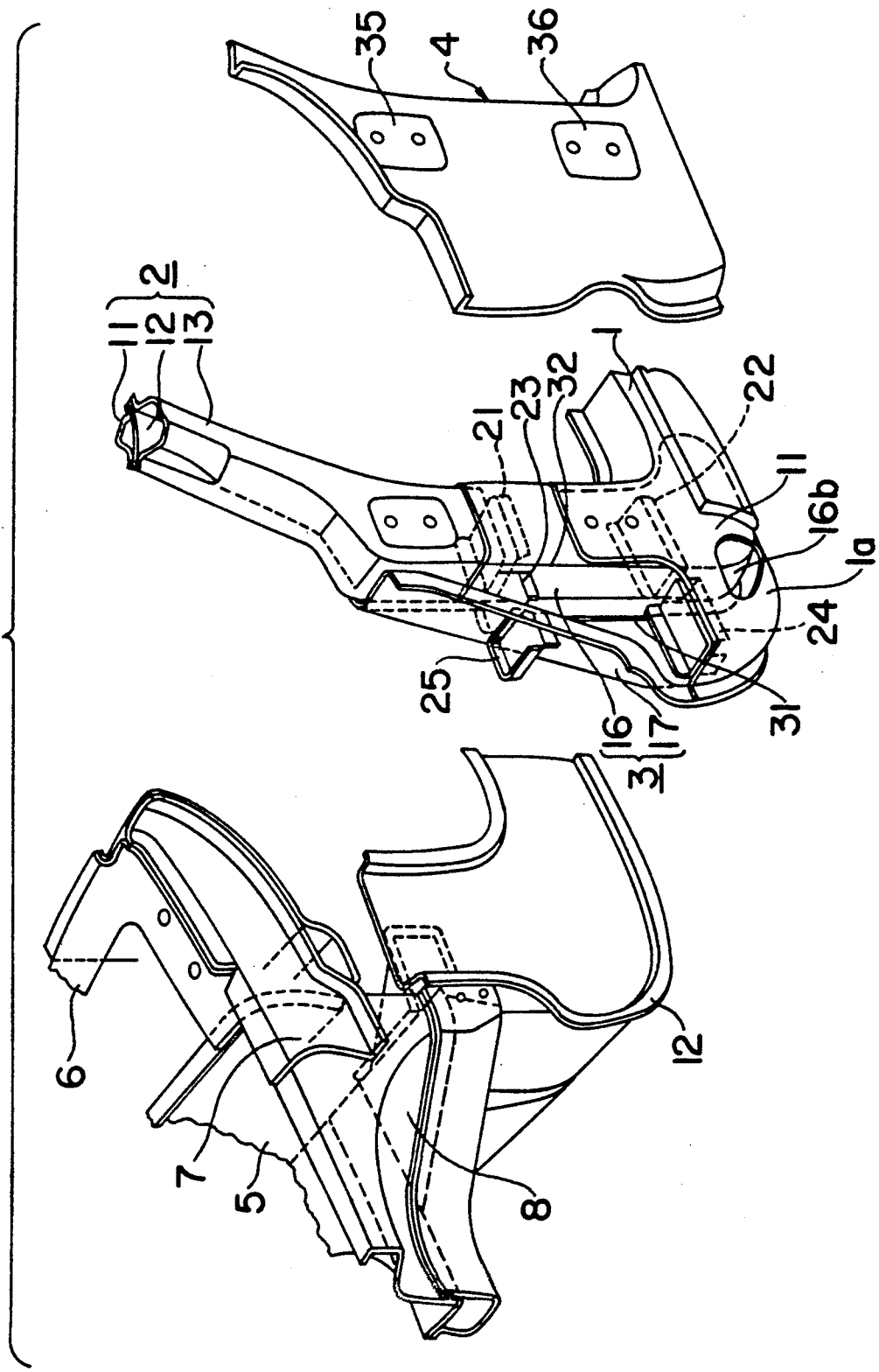
FIG. 2B is an exploded view of the portion shown in FIG. 2A.

As shown in FIGS. 1, 2A and 2B, the front body structure is comprised of a set of spaced apart side sills 1 extending longitudinally along both sides of the vehicle body, a set of front pillars P extending substantially vertically on both sides of the vehicle body and secured to respective side sills 1, dashboard lower and upper panels 5 and 6, respectively, extending laterally of the vehicle body and connected with each other, a pair of fender reinforcement members 7 spaced apart and disposed on both sides of the vehicle body and connected to respective pillars P and to the dashboard lower and upper panels 5 and 6, and a set of front frames 8 disposed in front of respective reinforcement members 7 and connected to the pillars P and to the dashboard lower panel 5.

As shown in FIGS. 1, 2B, 3, and 4, each side sill 1 comprises an outer panel 11 and an inner panel 12, which together form a closed cross section. A front end 1a of the side sill 1 is bent so as to be substantially L-shaped and an upper end portion thereof opens upwardly and is secured to a pillar 3 to which a door is hingedly connected (this pillar is hereinafter referred to as a hinge pillar).

Figure 6:
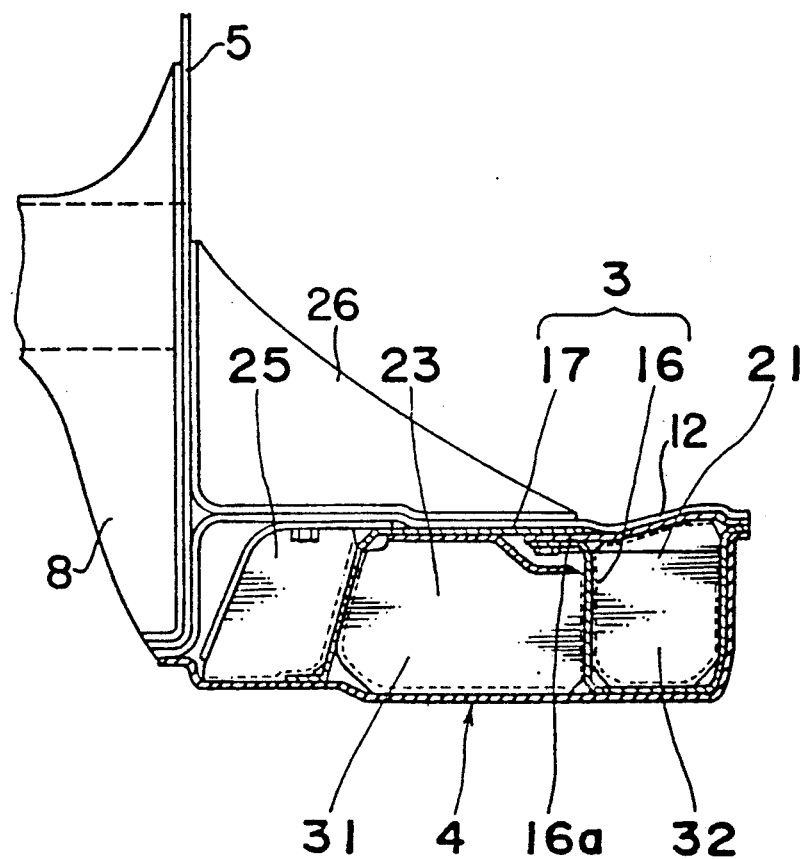
FIG. 6 is a cross-sectional view taken along the line VI—VI in FIGS. 2A and 2B.

As shown in FIGS. 2A, 2B, 3, and 5, each front pillar portion 2 comprises an outer panel 13, an inner panel 14 and a reinforcement member 15, thereby forming two separated portions having closed cross sections. Each hinge pillar 3 comprises an outer panel 16 with a substantially U-shaped cross section connected to a lower end of the front pillar outer panel 13, and an inner panel 17 with a substantially L-shaped cross section rigidly secured to a front flange 16a of the outer panel 16 in such a manner that the inner panel 17 extends forwardly from the front flange 16a of the outer panel 16, as shown in FIG. 6.

The lower end of the hinge pillar 3 is secured to the front end 1a of the side sill 1 by being sandwiched between the side sill outer and inner panels 11 and 12. Furthermore, a cowl side panel 4 is secured to the front end 1a of the side sill 1 and the hinge pillar outer panel 16 on each side of the vehicle body. The front pillar portion 2, the hinge pillar 3, and the cowl side panel 4 constitute the pillar P.

With the pillar P and the side sill 1 connected to each other, two separate portions 31, 32 having closed cross sections separated by a transverse front portion 16b of the hinge pillar outer panel 16 are formed inside the pillar P and adjoin along the longitudinal direction of the vehicle body, as shown in FIGS. 2A and 2B.

A front portion 16b of the hinge pillar outer panel 16 extends into the inside of the side sill 1 and the lower transverse end thereof also separates the inside of the side sill 1 into separate portions adjoining along the longitudinal direction of the vehicle body. Accordingly, the two separated portions 31 and 32 are formed not only inside the pillar P above the side sill 1 but also inside the side sill 1. Furthermore, the transverse front portion 16b of the hinge pillar outer panel 16 extends to the inside of the side sill 1 and acts as a reinforcement member for separating the inside of the pillar P and the side sill 1 into two separate portions adjoining along the longitudinal direction of the vehicle body. In order to further rigidify the pillar P of the automobile front body structure, five reinforcement members 21-25 are installed inside the pillar P. The reinforcement members 21-25 are arranged in a manner such that three of the reinforcement members 21, 23 and 25 are respectively aligned above the remaining two reinforcement members 22 and 24 with respect to the longitudinal direction of the vehicle body, as shown in FIGS. 2A and 2B, to thereby form a plurality of reinforcement members along this direction. One of these five reinforcement members is disposed outside of the closed cross sections of the portions 31 and 32, whereas the other four reinforcement members 21-24 are disposed inside the closed cross sections of the portions 31 and 32.

As described above, the front portion 16b of the hinge pillar outer panel extends in a transverse direction so as to separate the two closed cross section portions 31,32. The two portions 31 and 32 are formed adjacent to each other along the longitudinal direction of the vehicle body and are formed inside the pillar P and extend into the inside of the side sill 1, to thereby increase the rigidity of the pillar and the side sill to resist against bending forces which act on the pillar P in the longitudinal direction of he vehicle body relative to a pillar which has but a single portion of closed cross-section formed therein. Accordingly, the longitudinal rigidity of the pillar P is effectively increased.

In this embodiment, since the transverse front portion 16b of the hinge pillar outer panel 16 extends within both the pillar P and the side sill 1, it effectively acts as a reinforcement member for reinforcing and separating both the inside of the pillar P and the inside of the side sill 1 along the longitudinal direction (i.e. the front portion 16b separates the inside of both the pillar and the side sill into two portions aligned along the longitudinal direction). This significantly increases the rigidity of the connection between the pillar P and the side sill 1. It goes without saying that the rigidity of the connection between the pillar P and the side sill 1 is also increased by the provision of the reinforcement members 21-25 installed inside the pillar P.

Furthermore, in this embodiment, mounting portions 35 and 36 for mounting door hinges 37 and 38 are installed on the cowl side panel 4, as shown in FIGS. 1, 2A, 2B, and 3, in order to effectively utilize the reinforcement effects provided by the reinforcement members 21-25, the front portion 16b of the hinge pillar outer panel 16, and the like. In this regard, the door hinge mounting portions 35 and 36 are formed at locations near the front portion 16b of the hinge pillar outer panel 16 and the reinforcement members 21 and 22.

Figure 3:
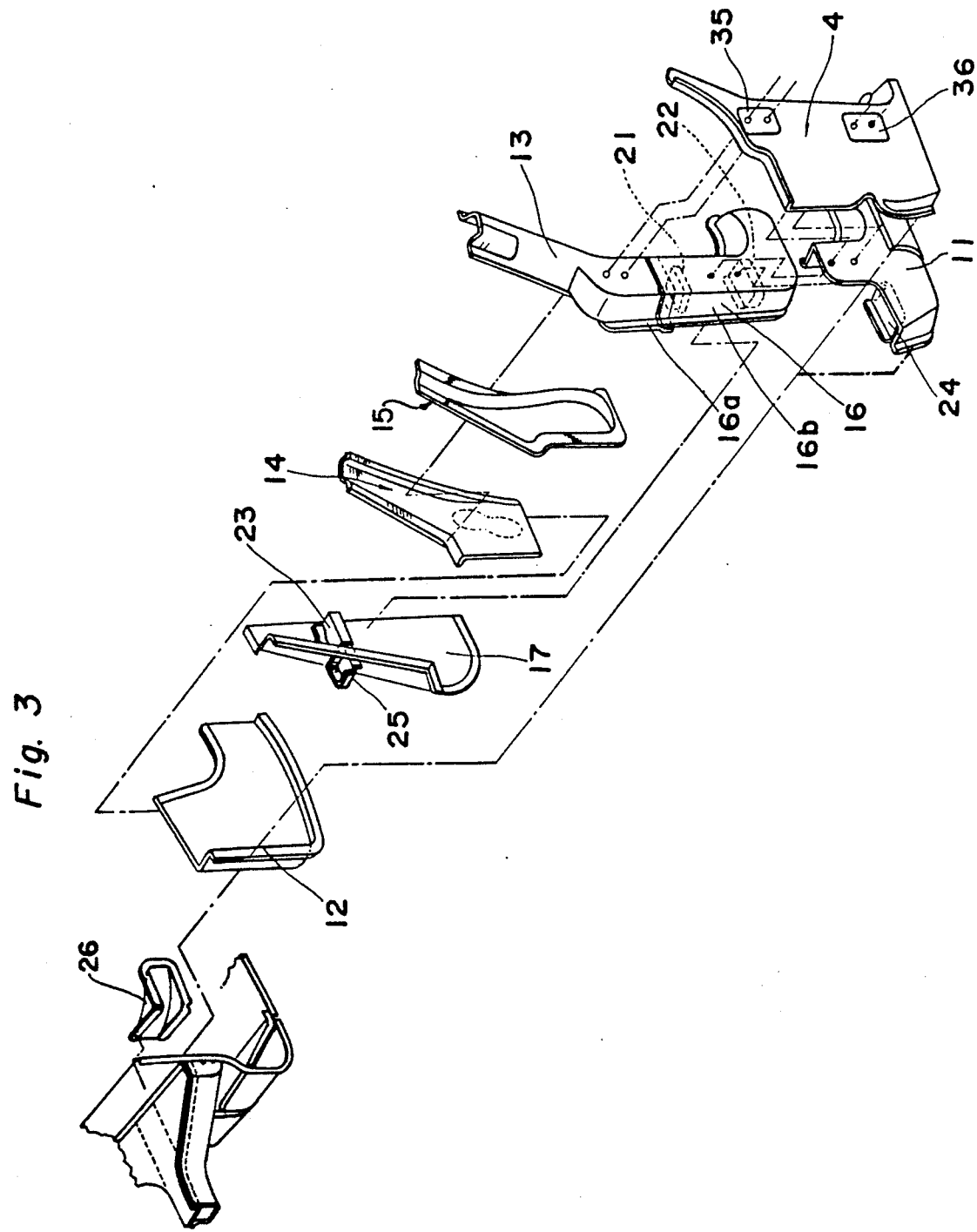
FIG. 3 is an exploded perspective view of a front pillar, a side sill, and the like shown in FIG. 2A and 2B.
Figure 4:
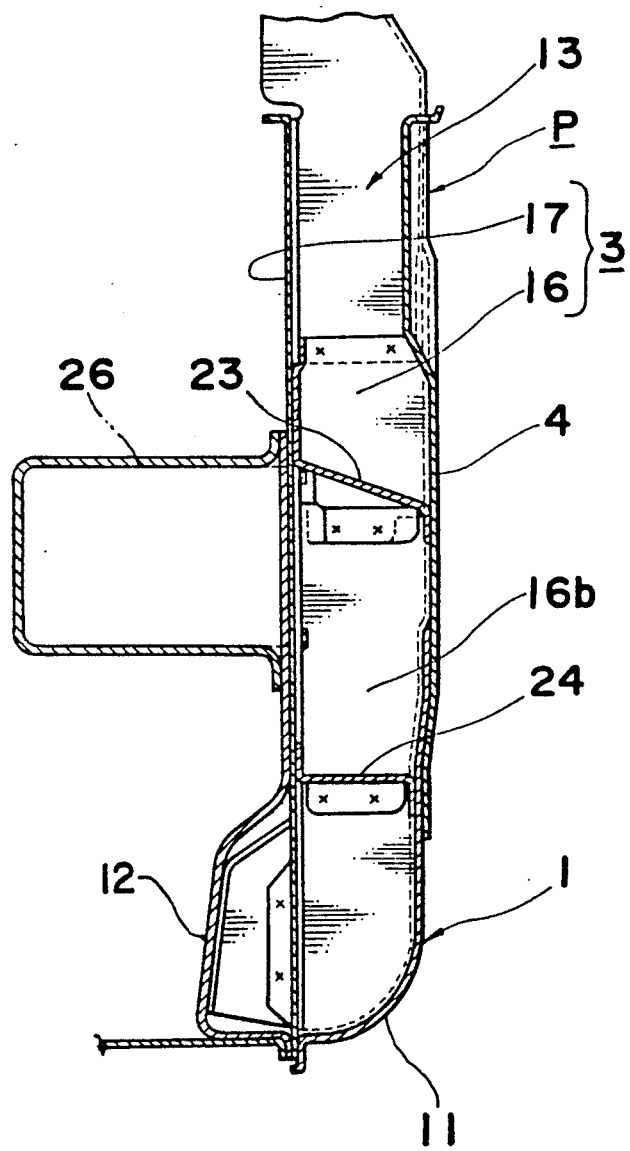
FIG. 4 is a cross-sectional view taken along the line IV—IV in FIGS. 2A and 2B.
Figure 5:
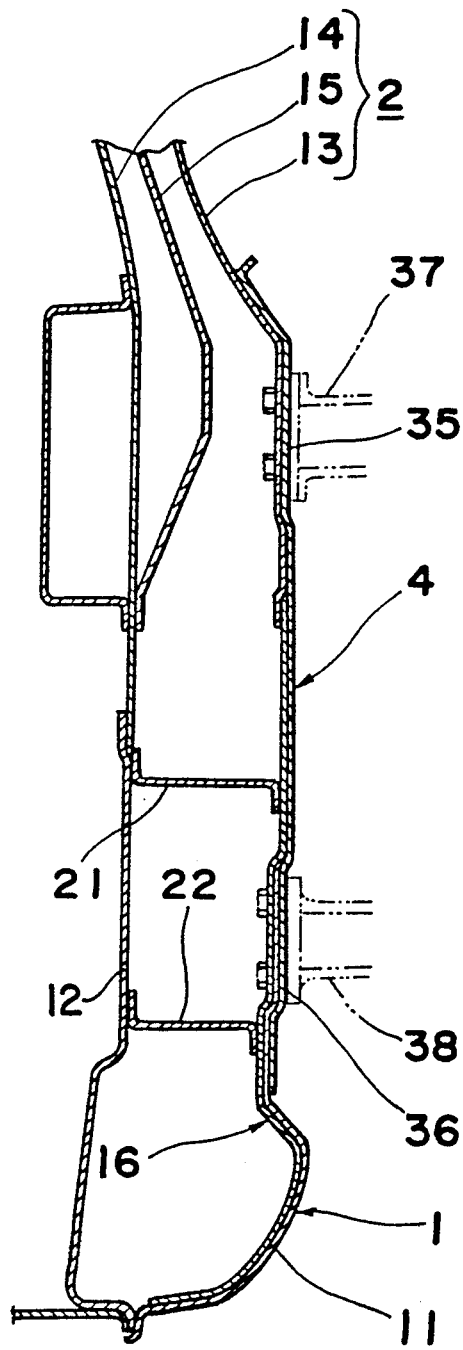
FIG. 5 is a cross-sectional view taken along the line V—V in FIGS. 2A and 2B.

As shown in FIGS. 3 and 4, a substantially triangular corner bracket 26 is installed at a corner between the front frame 8 and the pillar P to rigidify the connection between these two members. The edge of the corner bracket 26 secured to the pillar P is mounted adjacent the three reinforcement members 21, 23, and 25 located inside the pillar P so that the load imposed upon the corner bracket 26 is received by the entire pillar P through these reinforcement members 21, 23, and 25.

Although the present invention has been fully described by ways of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A front body structure for an automobile body, said front body structure comprising:
    a hollow side sill extending longitudinally of the automobile body along one side thereof;
    a hollow pillar secured at a lower end thereof to a front end of said side sill and extending substantially vertically upwardly therefrom, said hollow side sill and said hollow pillar together forming a chamber therein; and
    a separation member mounted within said chamber and extending vertically upwardly from a location within said side sill to a location within said pillar, said separation member being mounted across said chamber in a direction transversely of the automobile body in both said side sill and said pillar so as to separate said chamber into two longitudinally aligned separated portions, said two separated portions being formed with substantially closed cross sections, respectively.

2. A front body structure as recited in claim 1, wherein
    said side sill, said pillar, and said separation member are employed in an open-type automobile body.

3. A front body structure as recited in claim 1, further comprising
    at least one reinforcement member mounted within at least one of said two separated portions and extending longitudinally of the automobile body within said at least one of said two separated portions.

4. A front body structure as recited in claim 1, wherein
each of said two separated portions has two reinforcement members mounted therein.

5. A front body structure as recited in claim 4, wherein
in each of said two separated portions, one of said two reinforcement members mounted therein is aligned above the other of said two reinforcement members mounted therein.

6. A front body structure as recited in claim 5, further comprising
a reinforcement member mounted to said pillar outside of said two separated portions.

7. A front body structure as recited in claim 6, wherein
said reinforcement member mounted outside said two separated portions is horizontally aligned with each of the upper ones of said reinforcement members mounted within each of said two separated portions.

8. A front body structure as recited in claim 7, wherein
each of said reinforcement members is substantially horizontal.

* * * * *